United States Patent
Yang

(10) Patent No.: US 8,279,631 B2
(45) Date of Patent: Oct. 2, 2012

(54) LIMITING PRIMARY PEAK CHARGE TO CONTROL OUTPUT CURRENT OF A FLYBACK CONVERTER

(75) Inventor: Jian Yang, Thousand Oaks, CA (US)

(73) Assignee: Active-Semi, Inc. (VG)

( * ) Notice: Subject to any disclaimer, the term of this patent is extended or adjusted under 35 U.S.C. 154(b) by 1090 days.

(21) Appl. No.: 12/221,691

(22) Filed: Aug. 5, 2008

(65) Prior Publication Data

US 2010/0033136 A1    Feb. 11, 2010

(51) Int. Cl.
    *H02M 3/335*          (2006.01)
(52) U.S. Cl. .................. 363/20; 363/21.12; 363/21.17
(58) Field of Classification Search .......... 363/20, 363/21.01, 21.12, 21.15, 21.17, 21.18
See application file for complete search history.

(56) References Cited

U.S. PATENT DOCUMENTS

| | | | |
|---|---|---|---|
| 7,099,163 B1 * | 8/2006 | Ying | 363/21.11 |
| 7,639,517 B2 * | 12/2009 | Zhou et al. | 363/21.17 |
| 2006/0056204 A1 * | 3/2006 | Yang et al. | 363/10 |
| 2007/0103944 A1 * | 5/2007 | Mori | 363/21.12 |

* cited by examiner

*Primary Examiner* — Nguyen Tran
(74) *Attorney, Agent, or Firm* — Imperium Patent Works; Darien K. Wallace

(57) ABSTRACT

A controller IC adjusts the on time and cycle time of current flowing through the primary inductor of a flyback converter to generate a constant output current and constant output voltage. A desired output current limit is achieved even with an inductor whose inductance varies from the stated magnitude. A transconductance current is generated from a voltage across an emitter resistor and is then integrated to generate an integrated-current voltage. An inductor switch is turned on by an oscillator signal and turned off at the earlier of when the integrated-current voltage reaches a charge limit voltage during constant current mode or when the emitter resistor voltage reaches an error voltage during constant voltage mode. Current is output independently of the primary inductance by varying the current limit voltage inversely proportionally to the input voltage and by adjusting the cycle time so that it varies inversely proportionally to the output voltage.

19 Claims, 8 Drawing Sheets

LIMITING PRIMARY PEAK CHARGE TO CONTROL OUTPUT CURRENT

LIMITING PRIMARY PEAK CHARGE TO CONTROL OUTPUT CURRENT OF A FLYBACK CONVERTER

TECHNICAL FIELD

The present invention relates generally to the field of power conversion and, more particularly, to a primary-side regulated controller that generates constant output current by limiting charge as opposed to limiting current.

BACKGROUND

Flyback converters are used as battery chargers and AC adapters that can supply a constant current to a heavy load and a constant voltage to a light load, for example as a battery becomes fully charged. Thus, flyback converters are said to operate in a constant current mode and in a constant voltage mode. Flyback converters can also operate in various modes of the switching cycles. For example, flyback converters operate in a discontinuous conduction mode (DCM), a critical conduction mode (CRM) or a continuous conduction mode (CCM). In discontinuous conduction mode, there is a time gap after all of the energy that was transferred to a secondary inductor has been released and before current again begins to ramp up through a primary inductor.

In the constant current mode, the current output by the flyback converter ideally should not exceed the specified current limit, despite changing operational conditions and inconsistent manufacturing processes. For example, the output current in the constant current mode should not exceed a predetermined current limit despite (i) variations with temperature of the base-emitter offset voltage of the inductor switch, (ii) propagation delays of current sense comparators and delays in turning off the inductor switch, or (iii) variations in the inductance of the inductors of the transformer of the converter.

The inductance of a typical inductor type can vary by ±20%. Considering this low precision of the conventional processes for manufacturing inductors, the variations in the inductance $L_P$ of the primary inductor can significantly divert the output current from the predetermined current limit.

There are various existing designs for flyback converters that attempt to generate an output current that does not exceed a specified current limit. FIG. 1 (prior art) illustrates an exemplary prior art flyback converter 10 that generates both constant output current and constant output voltage. Flyback converter 10 operates in discontinuous conduction mode. Flyback converter 10 includes a transformer 11, a transistor $T_1$ 12, a controller integrated circuit (IC) 13, a current sense resistor $R_{CS}$ 14 and a current set resistor $R_{ISET}$ 15. Transformer 11 includes a primary inductor 16, a secondary inductor 17, and an auxiliary inductor 18. Transistor $T_1$ 12 acts as a switch to primary inductor 16. Feedback to regulate output current and voltage is received from a reflected voltage through transformer 11.

FIG. 2 (prior art) is a more detailed schematic diagram of controller IC 13. Controller IC 13 includes a first comparator 19, a second comparator 20, an OR gate 21, an RS latch 22, an oscillator 23, a driver 24, an error amplifier 25, a compensation network 26 and a constant voltage source 27. In addition, controller IC 13 includes a power pin (VDD), a ground pin (GND), a current set pin (ISET), an output pin (OUT), a current sense pin (CS) and a feedback pin (FB).

In operation, oscillator 23 initiates a turn-on pulse that sets RS latch 22. Thereupon, RS latch 22 outputs a digital high onto output lead Q, and driver 24 turns on transistor $T_1$ 12. When transistor $T_1$ 12 turns on, current ramps up linearly through primary inductor 15 at a rate defined by the primary inductance $L_P$ and the input voltage $V_{IN}$. As the current flowing from the emitter of transistor $T_1$ 12 increases, the voltage across current sense resistor $R_{CS}$ 14 also increases. The voltage across current sense resistor $R_{CS}$ 14 is received on current sense pin CS and is compared by second comparator 20 to the voltage level $V_{ILIM}$. When the voltage across current sense resistor $R_{CS}$ 14 reaches the voltage level $V_{ILIM}$, second comparator 20 trips, and transistor $T_1$ 12 is turned off. Transistor $T_1$ 12 remains off until all of the energy that was stored in the transformer while current was ramping up through primary inductor 15 is transferred to the secondary side of flyback converter 10. At this point, the voltages across all of the inductors begin to fall toward zero until oscillator 23 outputs the next turn-on pulse, at which point transistor $T_1$ 12 turns on and the switching cycle repeats.

In the constant current mode, the output current of flyback converter 10 is limited by adjusting the output current such that the voltage across current sense resistor $R_{CS}$ 14 equals the predetermined voltage level $V_{ILIM}$. The voltage level $V_{ILIM}$ is conventionally set, however, based on the following relationship between $V_{ILIM}$ and the output current $I_{OUT}$:

$$I_{OUT} = \frac{1}{2} \cdot L_P \cdot \left(\frac{V_{ILIM}^2}{R_{CS}^2}\right) \cdot Y \cdot \eta, \qquad (28)$$

where $L_P$ is the inductance of primary inductor 15, Y is a constant and $\eta$ is the efficiency of flyback converter 10. The output current $I_{OUT}$ is set by adjusting the resistances of current sense resistor $R_{CS}$ 14 and current set resistor $R_{ISET}$ 15 based on the inductance of primary inductor 15 as stated by the manufacturer. Equation 28 illustrates, however, that the actual output current $I_{OUT}$ will deviate from the desired set output current by the proportion by which the primary inductance $L_P$ deviates from the stated inductance.

A flyback converter is sought that can output a current at a predetermined limit that does not vary as a result of a variation in the inductance $L_P$ of the primary inductor. In addition, a method is sought for generating a power converter output current that has a magnitude that is independent of the primary inductance $L_P$ of the power converter.

SUMMARY

A controller IC adjusts the on time and cycle time of current flowing through the primary inductor of a flyback converter to generate a constant output current and a constant output voltage. A desired output current limit can be consistently achieved even with mass-produced inductors whose inductances vary from the stated magnitude. A transconductance current is generated from a voltage across an emitter resistor and is then integrated to generate an integrated-current voltage. The voltage across the emitter resistor is indicative of the current flowing through the primary inductor. An inductor switch is turned on by the pulse of a clock signal. The inductor switch is turned off, and current stops flowing through the primary inductor, at the earlier of when the integrated-current voltage reaches a charge limit voltage during constant current mode or when the voltage across an emitter resistor reaches an error voltage during constant voltage mode.

The error voltage is proportional to the difference between a reference voltage and a feedback voltage that is indicative of the voltage across the auxiliary inductor of the flyback converter. The output current is set at a level that is independent of the primary inductance by varying the charge limit voltage inversely proportionally to the input voltage and by adjusting the cycle time to vary inversely proportionally to the output voltage.

In one embodiment, a power converter with a controller IC generates a current sense voltage that is indicative of an inductor current flowing through the primary inductor of the power converter. Current flows through the primary inductor during an on time and does not flow through the primary inductor during an off time. A cycle time is the sum of the on time and off time. The cycle time is also the reciprocal of the switching frequency at which an inductor switch switches current through the primary inductor. The inductor current flows out of the primary inductor, through the inductor switch and across an emitter resistor. The current sense voltage is the voltage across the emitter resistor. The current sense voltage is received onto a current sense bond pad of the controller IC.

A transconductance amplifier receives the current sense voltage and generates a transconductance current. An integrated-current voltage is generated when the transconductance current is integrated by an integrating capacitor. The power converter generates a feedback voltage that is indicative of the input voltage and the output voltage of the power converter. The feedback voltage is the divided voltage across an auxiliary inductor of the power converter. A reference voltage generator receives a voltage across a current set resistor as well as the feedback voltage and outputs a charge limit voltage. The charge limit voltage is inversely proportional to the input voltage. A first comparator asserts a current control signal when the integrated-current voltage reaches the charge limit voltage. The on time of current flowing through the primary inductor ends when the current control signal is asserted.

In a constant current mode of the power converter, the switching frequency is adjusted so that it varies proportionally with the output voltage. An oscillator generates a clock signal whose turn-on pulses determine the switching frequency. When the output current rises to the point that the integrated-current voltage reaches the charge limit voltage, the output current is limited and the output voltage drops. The switching frequency is then "folded back" in the constant current mode such that the output current is kept from rising by reducing the switching frequency as the output voltage drops.

The power converter generates an output current with a magnitude that is independent of the inductance by integrating the transconductance current. Thus, by knowing the transconductance of a transconductance amplifier and the capacitance of an integrating capacitor, by generating the charge limit voltage that is inversely proportional to the input voltage, and by setting the resistance of the emitter resistor, the output current is limited to a predetermined level that is independent of the primary inductance. The output current is limited by stopping the on time when the integrated-current voltage from the transconductance current signal reaches the charge limit voltage established by the reference voltage generator and the external current set resistor.

In another embodiment, a power converter includes an inductor, a current integrator, a comparator, an oscillator and an inductor switch. An inductor current flowing through the inductor ramps up during an on time and does not flow through the inductor during an off time. The oscillator generates a clock signal that starts the on time. The current integrator generates a transconductance current using a current sense voltage and then outputs an integrated-current voltage by integrating the transconductance current. The comparator generates a current control signal by comparing the integrated-current voltage to a charge limit voltage. The on time ends and the off time begins when the current control signal is asserted.

The inductor switch is controlled by a switching signal. In the constant current mode, the switching signal turns off the inductor switch when the current control signal is asserted. The on time plus the off time equals a cycle time. The power converter maintains a constant output current by using the current control signal to adjust the on time and the clock signal to adjust the cycle time. The current control signal adjusts the on time such that the output current does not exceed a predetermined current limit despite a variation in the inductance of the inductor. The power converter operates in discontinuous conduction mode and in both a constant current mode and a constant voltage mode.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
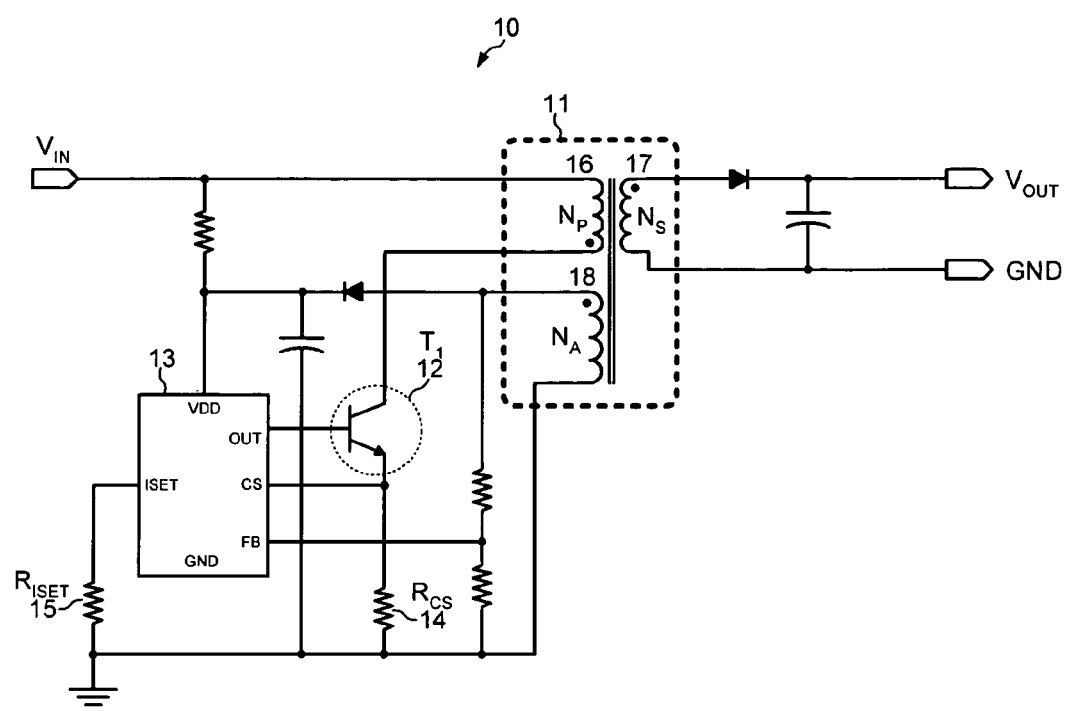
FIG. 1 (prior art) is a simplified schematic diagram of a conventional flyback converter with a controller integrated circuit (IC) that regulates output current by comparing a voltage across an emitter resistor to a current limit voltage.
Figure 2:
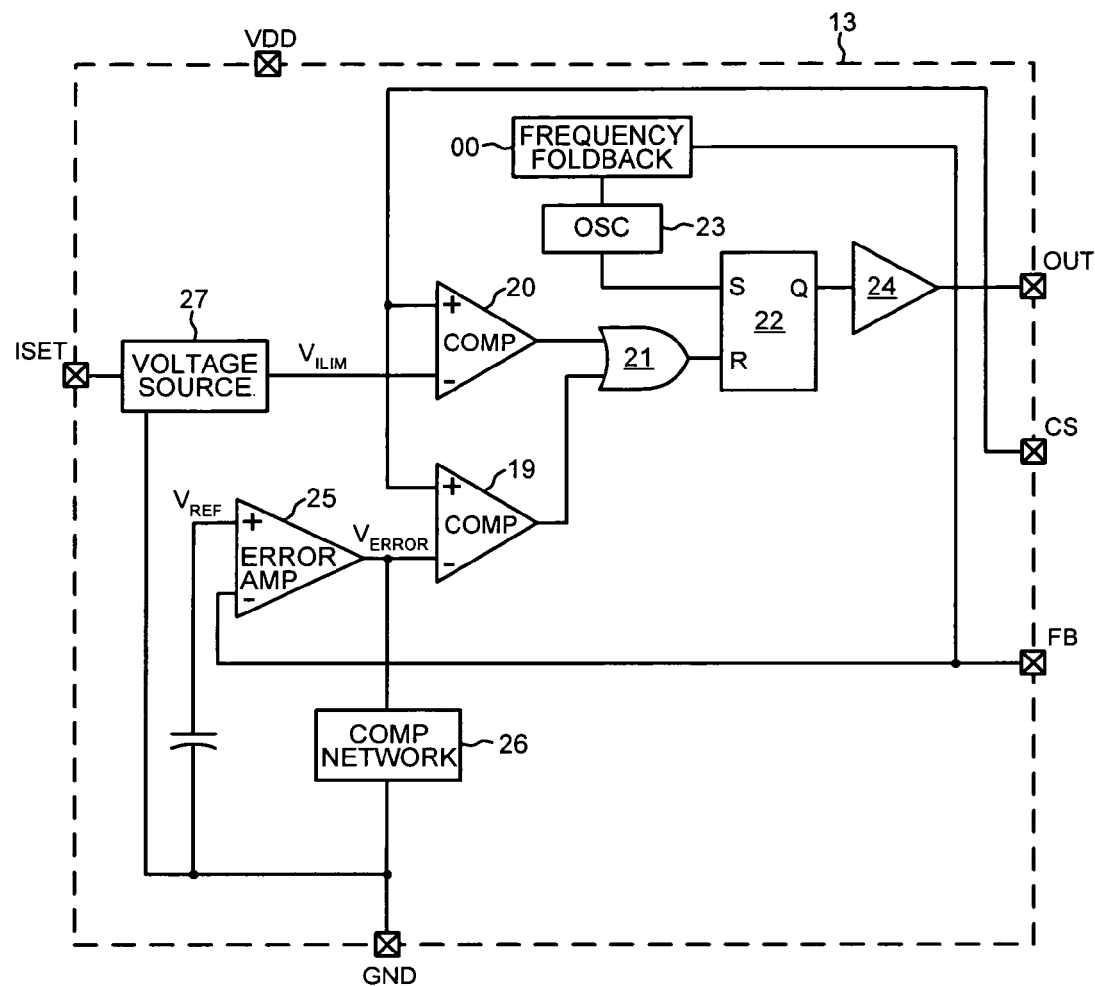
FIG. 2 (prior art) is a more detailed schematic diagram of the controller IC of FIG. 1.
Figure 3:
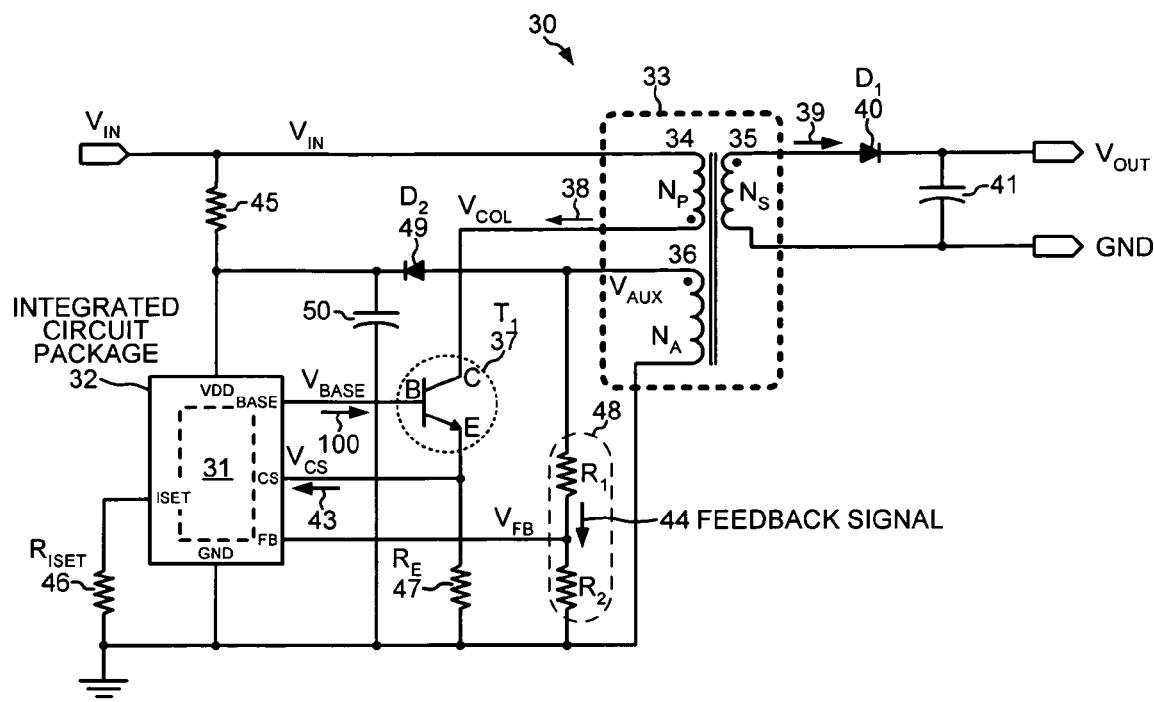
FIG. 3 is a simplified schematic diagram of a primary-side controlled flyback converter with a controller IC that generates a constant output current that is independent of the primary inductance by comparing an integrated current to a charge limit voltage.

FIG. 3 is a diagram of a primary-side controlled flyback converter 30 with a controller integrated circuit (IC) 31 packaged in an integrated circuit package 32. Flyback converter 30 includes a transformer 33 that converts an input voltage into a different output voltage. Transformer 33 includes a primary inductor (winding) 34, a secondary inductor 35 and an auxiliary inductor 36. Primary inductor 34 has $N_P$ turns; secondary inductor 35 has $N_S$ turns; and auxiliary inductor 36 has $N_A$ turns.

In one embodiment, the input voltage is the voltage from a wall outlet, and the output voltage is used to charge a portable electronic consumer device, such as a cell phone or portable media player. For example, flyback converter 30 converts a line voltage of 120V into 12V. When an inductor switch $T_1$ 37 in converter 30 is turned on, an inductor current ($I_{LP}$) 38 starts flowing through primary inductor 34. After current ramps up through primary inductor 34 to a peak magnitude and is then stopped, a collapsing magnetic field around primary inductor 34 transfers energy to secondary inductor 35. The peak at which current starts flowing through secondary inductor 35 is related by the turns ratio to the peak current $I_{PEAK}$ flowing through primary inductor 34. An output current $I_{OUT}$ 39 then flows out of secondary inductor 35, forward biases a secondary-side rectifier diode $D_1$ 40, and pours into an output capacitor 41. The energy transferred to secondary inductor 35 is output from flyback converter 30 as output current $I_{OUT}$ 39 with a different output voltage. In some applications, such as charging an electronic consumer device, it is desirable to prevent the output current from exceeding a predetermined current limit. For example, the electronic consumer device may be damaged if flyback converter 30 outputs more current than a specified maximum current.

Figure 4:
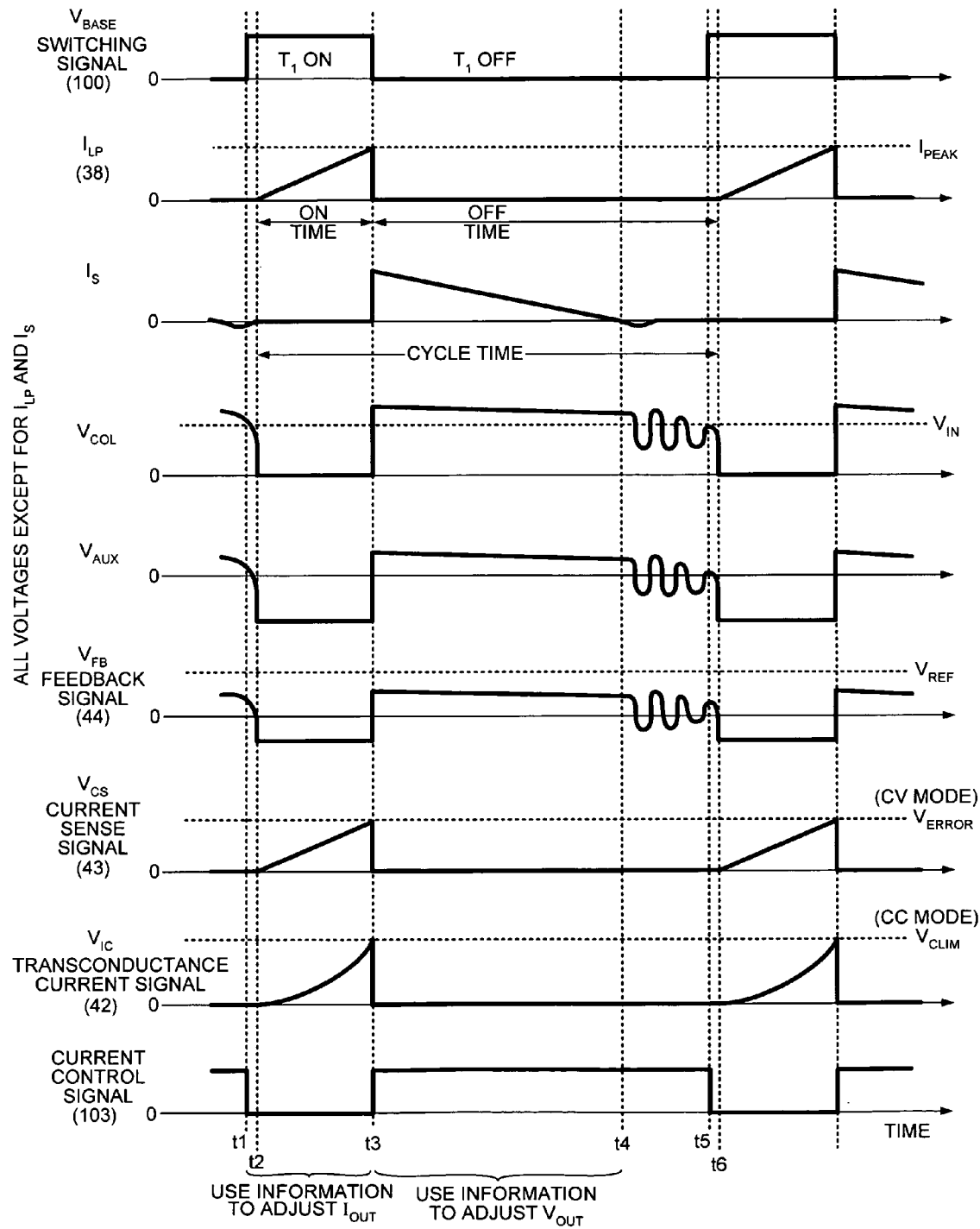
FIG. 4 is a diagram showing idealized waveforms that illustrate the operation of the flyback converter of FIG. 3.

FIG. 4 shows idealized waveforms on various nodes of flyback converter 30. The waveforms illustrate the operation of flyback converter 30, including how inductor switch $T_1$ 37 is turned on and off. Controller IC 31 controls output current $I_{OUT}$ 39 and the output voltage ($V_{OUT}$) of flyback converter 30 by adjusting the peak current $I_{PEAK}$ that flows through primary inductor 34. The peak current is regulated by adjusting the on time and off time during which current flows and does not flow through primary inductor 34. The on time and off time are controlled by inductor switch $T_1$ 37. Flyback converter 30 operates in two modes: a constant current mode and a constant voltage mode.

In the constant current mode, controller IC 31 controls inductor switch $T_1$ 37 such that the end of the on time at time ($t_3$), at which the primary inductor current $I_{LP}$ 38 stops increasing, corresponds to the time at which an integrated-current voltage ($V_{IC}$) of a transconductance current signal 42 reaches a charge limit voltage ($V_{CLIM}$). Whereas the rate at which the current from current sense signal 43 ramps compared to a constant reference voltage is dependent on the primary inductance $L_P$, the rate at which charge from current sense signal 43 ramps compared to a reference voltage that is inversely proportional to the input voltage is not. Thus, the magnitude of output current $I_{OUT}$ 39 is set to a limit that is independent of the primary inductance $L_P$ by terminating the on time of primary inductor 34 when the integrated-current voltage $V_{IC}$ reaches the set charge limit voltage $V_{CLIM}$, which is inversely proportional to the input voltage.

In the constant voltage mode, controller IC 31 controls inductor switch $T_1$ 37 such that the time $t_3$ at which the primary inductor current $I_{LP}$ 38 stops increasing corresponds to the time at which a current sense voltage ($V_{CS}$) of a current sense signal 43 reaches an error voltage ($V_{ERROR}$), which is lower than charge limit voltage $V_{CLIM}$. The error voltage $V_{ERROR}$ is generated by comparing a reference voltage ($V_{REF}$) to a voltage ($V_{FB}$) of a feedback signal 44 derived from auxiliary inductor 36.

In addition to controller IC 31, IC package 32, transformer 33, NPN bipolar transistor 37, secondary-side rectifier diode $D_1$ 40, and output capacitor 41, flyback converter 30 also includes a start-up resistor 45, a current set resistor $R_{ISET}$ 46, an emitter resistor $R_E$ 47, a voltage divider resistor network 48, a primary-side rectifier diode $D_2$ 49, and a capacitor 50. In the embodiment of FIG. 3, inductor switch $T_1$ 37 is an external NPN bipolar transistor. In another embodiment, inductor switch $T_1$ 37 is an external MOSFET switch. In yet another embodiment inductor switch $T_1$ 37 is a field-effect transistor (FET) that is integrated into controller IC 31.

Figure 5:
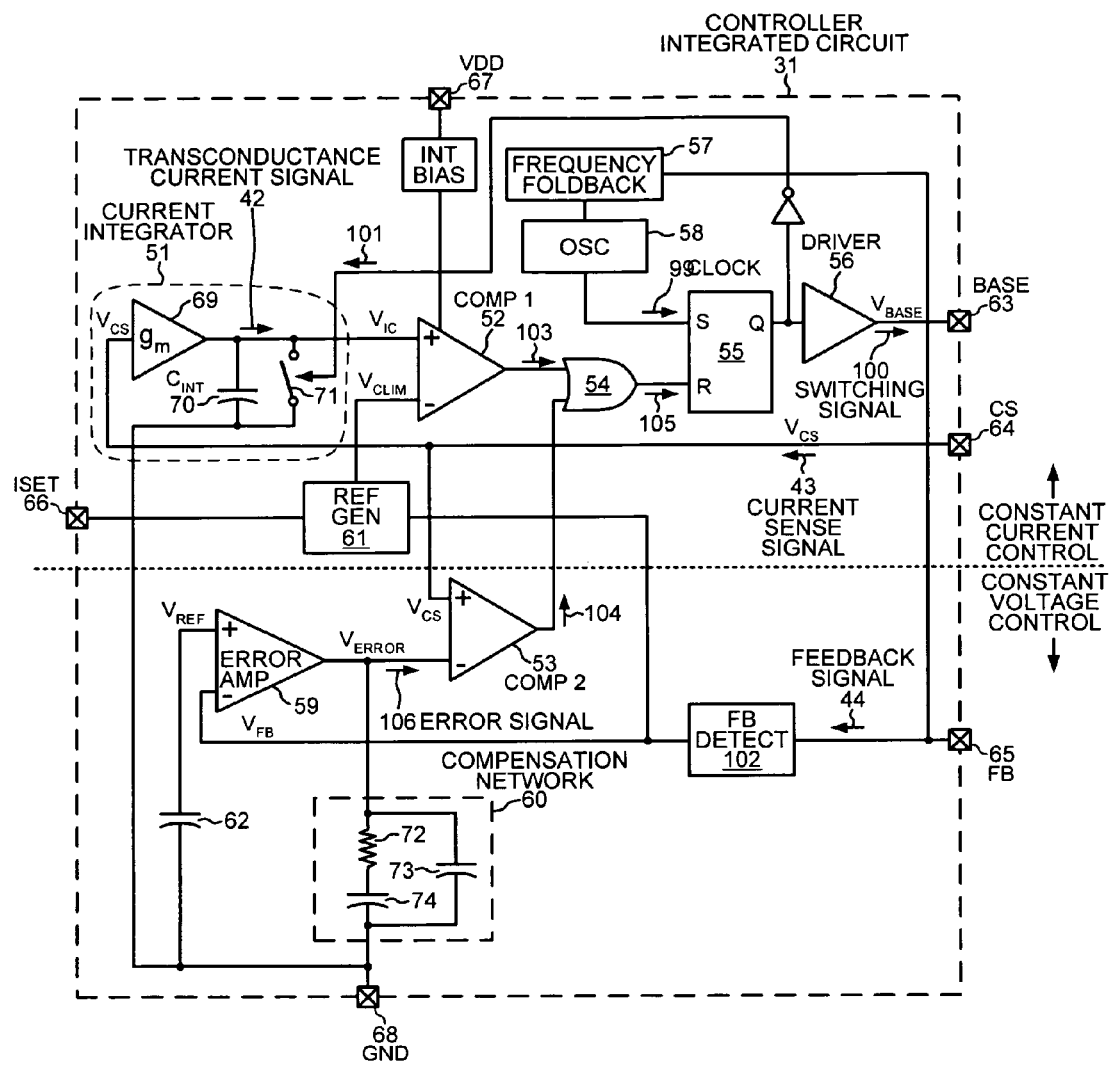
FIG. 5 is a more detailed schematic diagram of the controller IC of FIG. 3 that maintains the output current of the flyback converter within a predetermined current limit that is independent of the primary inductance.

FIG. 5 is a more detailed schematic diagram of controller IC 31. Controller IC 31 includes a current integrator circuit 51, a first comparator 52, a second comparator 53, an OR gate 54, an RS latch 55, a driver 56, a frequency foldback circuit 57, an oscillator 58, an error amplifier 59, a compensation network 60, a reference voltage generator 61 and a capacitor 62. In addition, controller IC 31 has a base bond pad (BASE) 63, a current sense bond pad (CS) 64, a feedback bond pad (FB) 65, a current set bond pad (ISET) 66, a power bond pad (VDD) 67 and a ground bond pad (GND) 68. Current integrator 51 includes a transconductance amplifier 69, an integrating capacitor ($C_{INT}$) 70, and a switch 71. Compensation network 60 includes a resistor 72 and two capacitors 73-74.

FIG. 5 is now used to describe how inductor switch $T_1$ 37 is turned on and off to generate a constant output current whose magnitude can be set independent of the primary inductance $L_P$. Also described is how inductor switch $T_1$ 37 is turned on and off to generate a constant output voltage. The current $I_{LP}$ 38 flowing through primary inductor 34 is used to determine when to turn inductor switch $T_1$ 37 on and off. The current flowing through emitter resistor $R_E$ 47 is about equal to the current $I_{LP}$ 38 flowing through primary inductor 34. As the primary inductor current $I_{LP}$ 38 increases and flows out the emitter of inductor switch $T_1$ 37, the current sense voltage $V_{CS}$ across emitter resistor $R_E$ 47 increases. The peak magnitude of the current sense voltage $V_{CS}$ provides an indication of the peak magnitude $I_{PEAK}$ of the current $I_{LP}$ 38 flowing through primary inductor 34. The magnitude of output current $I_{OUT}$, in turn, depends on the peak current $I_{PEAK}$ flowing through primary inductor 34 by the following relation:

$$I_{OUT} = \frac{1}{2} \cdot L_P \cdot I_{PEAK}^2 \left(\frac{1}{V_{OUT}}\right) \cdot f_S \cdot \eta, \tag{75}$$

where $L_P$ is the inductance of primary inductor 34, $f_S$ is the switching frequency of inductor switch $T_1$ 37 and $\eta$ is the efficiency of flyback converter 30. In one embodiment, the efficiency $\eta$ is about 70%. In the constant current mode, the primary inductor current $I_{LP}$ 38 is at the predetermined peak current limit $I_{PEAK}$ and is, therefore, constant.

The peak magnitude $I_{PEAK}$ of the current $I_{LP}$ 38 flowing through primary inductor 34 can be expressed in terms of the current sense voltage $V_{CS}$ across emitter resistor 47 and of the resistance $R_E$ of emitter resistor 47 as follows:

$$I_{PEAK} = \frac{V_{CS}}{R_E}. \tag{76}$$

Thus, the relation $$I_{PEAK}^2 = \frac{V_{CS}^2}{R_E^2}$$

can be combined with equation 75 to express the output current $I_{OUT}$ in the constant current mode in terms of the constant magnitudes $L_P$, $V_{CS}$ and $R_E$:

$$I_{OUT} = \frac{1}{2} \cdot L_P \cdot \left(\frac{V_{CS}^2}{R_E^2}\right)\left(\frac{F_S}{V_{OUT}}\right) \cdot \eta. \tag{77}$$

By adjusting the switching frequency $f_S$ to equal $Y \cdot V_{OUT}$, where Y is a constant, a constant output current is generated when primary inductor current $I_{LP}$ 38 is constant at the predetermined peak current limit $I_{PEAK}$ The constant output current can thus be expressed as:

$$I_{OUT} = \frac{1}{2} \cdot L_P \cdot \left(\frac{V_{CS}^2}{R_E^2}\right) \cdot Y \cdot \eta. \tag{78}$$

The output current $I_{OUT}$ is conventionally set by adjusting the resistance of emitter resistor $R_E$ 47 and the resistance of current set resistor $R_{ISET}$ 46 based on the inductance $L_P$ of primary inductor 34 as stated by the manufacturer.

The constant output current, however, may have an undesired magnitude because the actual inductance of primary inductor 34 may vary from the stated inductance. Thus, the controller IC 31 compares a voltage derived from an integrated current to the current limit reference voltage $V_{CLIM}$ in order to determine the output current based on the transconductance of the amplifier that generates the integrated current instead of based on the current sense voltage of the primary inductance $L_P$. By using current integrator 51 to adjust the output current, the output current can be expressed as:

$$I_{OUT} = \left(\frac{C_{INT}}{R_E \cdot g_m}\right) \cdot W \cdot \eta, \tag{79}$$

where $g_m$ is the transconductance of transconductance amplifier 69, $C_{INT}$ is the capacitance of integrating capacitor 70, and W is a constant that includes the constant Y at which the switching frequency $f_S$ is adjusted to equal $Y \cdot V_{OUT}$.

The relationship of equation 79 can be derived by expressing the output current in terms of the on time $T_{ON}$ and the off time $T_{OFF}$ of primary inductor 34. The output current can be expressed in terms of the off time $T_{OFF}$ and the peak current $I_{SECPK}$ flowing through secondary inductor 35 as follows:

$$I_{OUT} = \frac{1}{2} \cdot I_{SECPK} \cdot T_{OFF} \cdot f_S \cdot \eta. \tag{80}$$

In terms of the primary peak current $I_{PEAK}$, the output current is expressed as:

$$I_{OUT} = \frac{1}{2} \cdot (N_P/N_S) \cdot I_{PEAK} \cdot T_{OFF} \cdot f_S \cdot \eta. \tag{81}$$

The off time $T_{OFF}$ of primary inductor 34 can be expressed in terms of the time $T_{ON}$:

$$T_{OFF} = \frac{N_S}{N_P} \cdot \frac{V_{IN}}{V_{OUT}} \cdot T_{ON}. \tag{82}$$

Substituting the relation of equation 82 into equation 81 results in:

$$I_{OUT} = \frac{1}{2} I_{PEAK} \cdot \frac{V_{IN}}{V_{OUT}} \cdot T_{ON} \cdot f_S \cdot \eta. \tag{83}$$

Based on the circuit configuration as shown in FIG. 5, the integrated-current voltage $V_{IC}$ present on the non-inverting input lead of first comparator 52 can be expressed in terms of the resistance $R_E$ of emitter resistor 47, the transconductance $g_m$ of transconductance amplifier 69, the capacitance $C_{INT}$ of integrating capacitor 70, the primary peak current $I_{PEAK}$ and the on time $T_{ON}$. Hence, $$V_{IC} = \frac{R_E g_m}{2 C_{INT}} \cdot I_{PEAK} \cdot T_{ON}. \tag{84}$$

The reference voltage generator 61 of controller IC 31 generates a charge limit voltage $V_{CLIM}$ that is inversely proportional to the input voltage $V_{IN}$. In the constant current mode, the integrated-current voltage $V_{IC}$ is regulated to equal the charge limit voltage $V_{CLIM}$. Thus, in the constant current mode, the integrated-current voltage $V_{IC}$ is inversely proportional to the input voltage $V_{IN}$ according to the following relation:

$$V_{IC} = Z/V_{IN}, \tag{85}$$

where Z is a constant. Solving equation 84 for $I_{PEAK}$ after inserting equation 85 into equation 84 results in $$I_{PEAK} = \frac{Z 2 C_{INT}}{V_{IN} R_E g_m T_{ON}}. \tag{86}$$

Inserting equation 86 into equation 83 expresses the output current as follows:

$$I_{OUT} = \frac{Z C_{INT}}{R_E g_m}\left(\frac{f_S}{V_{OUT}}\right) \cdot \eta. \tag{87}$$

Where the switching frequency $f_S$ is adjusted in the constant current mode to equal $Y \cdot V_{OUT}$, and the constant W equals $Z \cdot Y$, equation 87 becomes equation 79. Thus, by knowing the transconductance $g_m$ of transconductance amplifier 69 and the capacitance $C_{INT}$ of integrating capacitor 70, by generating a charge limit voltage $V_{CLIM}$ that is inversely proportional to the input voltage $V_{IN}$, and by setting the resistance $R_E$ of emitter resistor 47, the output current $I_{OUT}$ 39 is limited to a predetermined level that is independent of the primary inductance $L_P$. The output current $I_{OUT}$ 39 is limited by stopping the on time $T_{ON}$ when the integrated-current voltage $V_{IC}$ of transconductance current signal 42 reaches the charge limit voltage $V_{CLIM}$ established by current set resistor $R_{ISET}$ 46 and reference voltage generator 61.

Figure 6:
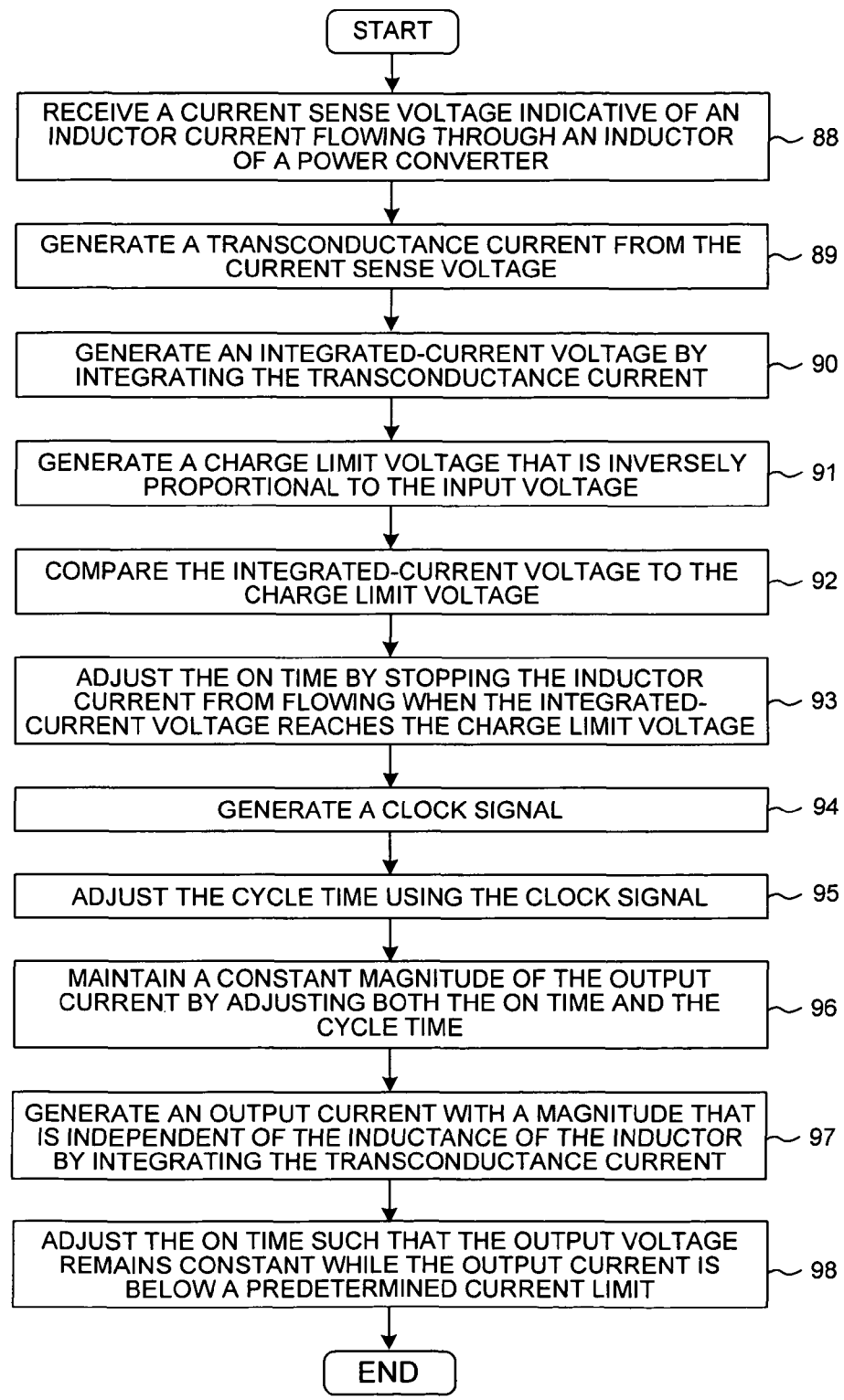
FIG. 6 is a flowchart showing steps of a method of operation of the flyback converter of FIG. 3.

FIG. 6 is a flowchart illustrating steps 88-98 of a method of operation of the flyback converter 30 of FIG. 3. The method controls both the output current $I_{OUT}$ 39 and the output voltage $V_{OUT}$ of flyback converter 30 by adjusting the on time of primary inductor 34. The method also permits the output current $I_{OUT}$ to be set to a predetermined maximum level that does not depend on the primary inductance $L_P$.

Each switching cycle begins when inductor switch $T_1$ 37 turns on. RS latch 55 receives a clock signal 99 with a turn-on pulse from oscillator 58. When RS latch 55 is set by the turn-on pulse, RS latch 55 outputs a digital high onto output lead Q, and a switching signal 100 output by driver 56 is asserted. After switching signal 100 is asserted at time $t_1$ in FIG. 4, inductor switch $T_1$ 37 turns on at time $t_2$ and primary inductor current $I_{LP}$ 38 starts ramping up through primary inductor 34. The current flowing from the emitter of inductor switch $T_1$ 37 and through emitter resistor $R_E$ 47 is about equal to the current $I_{LP}$ 38 flowing through primary inductor 34. The current flowing through emitter resistor $R_E$ 47 ramps up linearly at a rate defined by the inductance $L_P$ of primary inductor 34 and the input voltage $V_{IN}$. Hence, the current sense voltage $V_{CS}$ of current sense signal 43 also ramps up at a rate dependent on the primary inductance $L_P$ and the input voltage $V_{IN}$. Inductor switch $T_1$ 37 turns off at the earlier of the voltage $V_{CS}$ of current sense signal 43 reaching an error voltage $V_{ERROR}$ during constant voltage mode or the integrated-current voltage $V_{IC}$ reaching the charge limit voltage $V_{CLIM}$ during constant current mode.

Constant Current Mode

In a first step 88, the current sense voltage $V_{CS}$ across emitter resistor 47 is received onto current sense bond pad CS 64. The current sense voltage $V_{CS}$ of current sense signal 43 is indicative of the current $I_{LP}$ 38 flowing through primary inductor 34 according to equation 76.

In step 89, transconductance amplifier 69 receives the current sense voltage $V_{CS}$ of current sense signal 43 and outputs a transconductance current of transconductance current signal 42.

In a step 90, the transconductance current output by transconductance amplifier 69 is integrated to produce the integrated-current voltage $V_{IC}$. Before oscillator 58 generates the turn-on pulse that starts the primary inductor current 38, switch 71 of current integrator 51 is closed, and integrating capacitor $C_{INT}$ 70 is discharged. When RS latch 55 is set and outputs the digital high onto output lead Q, a discharge signal 101 is deasserted, which opens switch 71. Thus, during the on time of primary inductor 34, the transconductance current output by transconductance amplifier 69 accumulates on integrating capacitor $C_{INT}$ 70 as the integrated-current voltage $V_{IC}$.

In a step 91, reference voltage generator 61 generates a charge limit voltage $V_{CLIM}$ that is inversely proportional to the input voltage $V_{IN}$ according to equation 85. Reference voltage generator 61 receives feedback signal 44 from feedback bond pad FB 65. Reference voltage generator 61 uses the voltage $V_{FB}$ of feedback signal 44 to determine the input voltage $V_{IN}$. The voltage $V_{AUX}$ on the dot end of auxiliary inductor 36 is equal to the voltage $V_P$ on the dot end of primary inductor 34 times the turns ratio $N_A/N_P$. Primary inductor 34 is coupled directly to the input of flyback converter 30. Thus, $$V_{AUX} = V_{IN} \cdot N_A/N_P. \tag{105}$$

Consequently, the feedback voltage $V_{FB}$ present on feedback bond pad 65 can be expressed as:

$$V_{FB} = V_{IN} \cdot N_A/N_P \cdot R_2/(R_1+R_2). \tag{106}$$

where R1 and R2 are the resistances of the two resistors of voltage divider resistor network 48. A feedback signal detector 102 detects when the feedback voltage $V_{FB}$ of feedback signal 44 begins to collapse and ring at time $t_4$. Feedback signal detector 102 outputs the feedback voltage $V_{FB}$ at time $t_4$ to reference voltage generator 61. The charge limit voltage $V_{CLIM}$ and hence the predetermined maximum output current $I_{OUT}$ is set by adjusting the resistance of current set resistor $R_{ISET}$ 46. Reference voltage generator 61 uses the voltage drop across current set resistor $R_{ISET}$ 46 and well as the feedback voltage $V_{FB}$ to generate the charge limit voltage $V_{CLIM}$.

In a step 92, the integrated-current voltage $V_{IC}$ present on the non-inverting input lead of first comparator 52 is compared to the charge limit voltage $V_{CLIM}$ generated by reference voltage generator 61

In a step 93, the on time of primary inductor 34 is adjusted by stopping the primary inductor current $I_{LP}$ 38 from flowing when the integrated-current voltage $V_{IC}$ reaches the charge limit voltage $V_{CLIM}$. When the integrated-current voltage $V_{IC}$ reaches the charge limit voltage $V_{CLIM}$, a current control signal 103 output by first comparator 52 goes high. OR gate 54 receives both the current control signal 103 from first comparator 52 and a voltage control signal 104 from second comparator 53. A reset signal 105 output by OR gate 54 goes high when the first of current control signal 103 or voltage control signal 104 goes high. In the constant current mode, current control signal 103 goes high before voltage control signal 104 goes high. When current control signal 103 output by first comparator 52 goes high, reset signal 105 resets RS latch 55 and terminates the on time. When RS latch 55 is reset, RS latch outputs a digital low onto output lead Q, switching signal 100 is deasserted at time $t_3$, and inductor switch $T_1$ 37 is turned off and the off time begins. There is a finite time between when switching signal 100 is deasserted at time $t_3$ and when the secondary inductor current $I_S$ begins flowing. To simplify the illustrated waveforms in FIG. 4, the time lag after switching signal 100 is deasserted at time $t_3$ and the time at which the secondary inductor current $I_S$ begins to flow is not shown.

The off time continues until all of the energy that was stored in transformer 33 is transferred to the secondary side. When current is no longer flowing through any of the inductors, the voltages across the inductors begin to resonate and fall to zero.

Flyback converter 30 operates in the discontinuous current mode. Thus, there is a time gap after all of the energy that was transferred to secondary inductor 35 has been released and before current again begins to ramp up through primary inductor 34. It is during this time gap from $t_4$ to $t_6$ that the voltages across the windings ring. As illustrated in FIG. 4, the cycle time between pulses of clock signal 99 are longer than time during which current ramps up through primary inductor 34 and ramps down through secondary inductor 35.

In a step 94, RS latch 55 again receives turn-on pulse in clock signal 99 generated by oscillator 58. The cycle time between pulses of clock signal 99 is the time between the beginnings of the on time of primary inductor 34. Thus, the cycle time is the reciprocal of the switching frequency $f_S$ at which inductor switch $T_1$ 37 switches current through primary inductor 34.

In a step 95, the cycle time is adjusted using clock signal 99. As indicated above with regard to equation 78, in the constant current mode, the switching frequency $f_S$ is adjusted so that it varies proportionally with the output voltage $V_{OUT}$. When the output current rises to the point that the integrated-current voltage $V_{IC}$ reaches the charge limit voltage $V_{CLIM}$, the output current is limited and the output voltage drops.

In a step 96, a constant magnitude of the output current $I_{OUT}$ 39 is maintained by adjusting both the on time and the cycle time. The constant magnitude is set at a desired predetermined current limit. The on time is adjusted and terminated when the integrated-current voltage $V_{IC}$ reaches the charge limit voltage $V_{CLIM}$ and the current control signal 103 goes high. When the output voltage drops as a result of the output current being limited in the constant current mode, the switching frequency $f_S$ is reduced or "folded back" in order to keep the output current constant, as indicated by equation 87. If the switching frequency $f_S$ were not folded back and the cycle time increased, then the output current $I_{OUT}$ would rise despite the on time having been adjusted.

In a step 97, the output current $I_{OUT}$ 39 is generated with a magnitude that is independent of the primary inductance $L_P$. The desired predetermined current limit at which the constant magnitude of the output current $I_{OUT}$ 39 is set is also accurate because method by which the output current is determined does not depend on the accuracy of the stated primary inductance $L_P$. Current integrator 51 and reference voltage generator 61 allow the output current $I_{OUT}$ 39 to be limited based on the variables contained in equation 79, which does not include the primary inductance $L_P$. Thus, a stated output current limit can be more consistently achieved even when flyback converter 30 is manufactured in mass production in which the primary inductance $L_P$ varies from the stated magnitude by ±20%.

Constant Voltage Mode

In a step 98, the on time of primary inductor 34 is adjusted such that the output voltage $V_{OUT}$ remains constant while the output current $I_{OUT}$ 39 is below the predetermined current limit corresponding to the charge limit voltage $V_{CLIM}$.

In the constant voltage mode, inductor switch $T_1$ 37 also turns on at time $t_2$ in response to switching signal 100 being asserted at time $t_1$. Inductor switch $T_1$ 37 turns off when the voltage $V_{CS}$ of current sense signal 43 reaches an error voltage $V_{ERROR}$ of an error signal 106 output by error amplifier 59. The error voltage $V_{ERROR}$ indicates the amount of current required to achieve a regulated output voltage of flyback converter 30. As the load on the electronic consumer device that is being charged decreases, the regulated output voltage is reached before the predetermined output current limit. Thus, the regulated output voltage can be achieved in the constant current mode before the output current $I_{OUT}$ 39 reaches the peak current limit, and second comparator 53 compares the current sense voltage $V_{CS}$ to the error voltage $V_{ERROR}$ of error signal 106.

When inductor switch $T_1$ 37 is off, the feedback voltage $V_{FB}$ of feedback signal 43 is indicative of the output voltage $V_{OUT}$. The voltage $V_{AUX}$ on the dot end of auxiliary inductor 36 is equal to the voltage $V_S$ on the dot end of secondary inductor 35 times the turns ratio $N_A/N_S$. The voltage $V_S$ equals the output voltage $V_{OUT}$ plus the voltage $V_{D1}$ drop across secondary-side rectifier diode $D_1$ 40. Thus, $$V_{AUX} = (V_{OUT} + V_{D1}) \cdot N_A/N_S. \quad (107)$$

Consequently, the feedback voltage $V_{FB}$ present on feedback bond pad 65 can be expressed as:

$$V_{FB} = (V_{OUT} + V_{D1}) \cdot N_A/N_S \cdot R_2/(R_1 + R_2). \quad (108)$$

where R1 and R2 are the resistances of the two resistors of voltage divider resistor network 48. Feedback signal detector 102 detects when the feedback voltage $V_{FB}$ of feedback signal 44 begins to collapse and ring at time $t_4$. After time $t_3$, the feedback voltage $V_{FB}$ slowly decays towards zero volts during the off time due to the finite resistance of auxiliary winding 36. Feedback signal detector 102 samples the last voltage level of feedback voltage $V_{FB}$ before feedback signal 44 starts to resonate. The decay of the feedback voltage $V_{FB}$ toward zero volts during the off time is exaggerated for illustrative purposes in the waveform of FIG. 4. Feedback signal detector 102 outputs the feedback voltage $V_{FB}$ sampled at time $t_4$ to the inverting input lead of error amplifier 59.

The error voltage $V_{ERROR}$ output by error amplifier 59 has a magnitude that is proportional to the difference between a reference voltage $V_{REF}$ and the feedback voltage $V_{FB}$ present on feedback bond pad FB 65 at time $t_4$. In constant voltage mode, controller IC 31 sets the error voltage $V_{ERROR}$ such that the feedback voltage $V_{FB}$ is regulated to equal the reference voltage $V_{REF}$. During regulation, the output voltage of flyback converter 30 is:

$$V_{OUT} = V_{REF} \cdot \left(1 + \frac{R_1}{R_2}\right)\left(\frac{N_S}{N_A}\right) - V_{D1}. \quad (109)$$

Compensation network 60 stabilizes the error voltage $V_{ERROR}$ and compensates for phase shifting between error signal 106 and switching signal 51. Error amplifier 59 is a transconductance amplifier because it receives an input voltage differential and outputs a current proportional to the differential. Error amplifier 59 outputs error signal 106 with a current that flows onto capacitors 73-74 of compensation network 60 and generates the error voltage $V_{ERROR}$.

All of the elements of controller IC 31 are powered from power bond pad VDD 67. For simplicity, only the power line to first comparator 52 is shown in FIG. 5. The voltage received on power bond pad VDD 67 is regulated by an internal bias circuit before being used to power the elements of controller IC 31.

Figure 7:
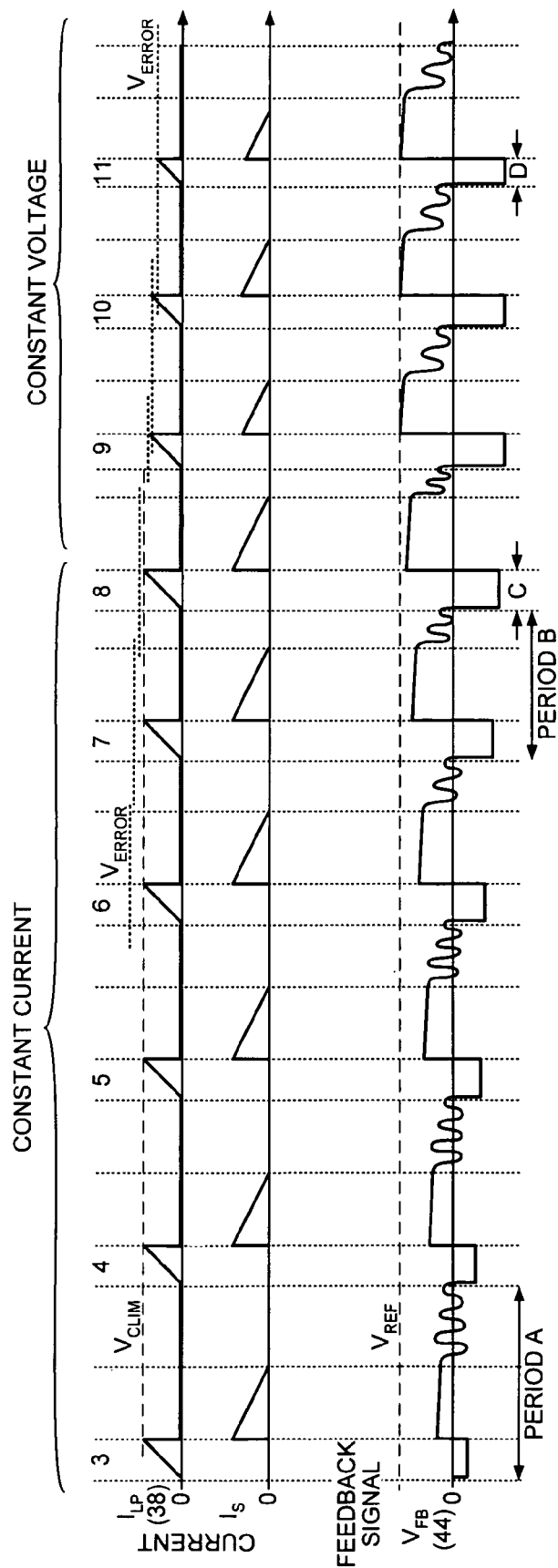
FIG. 7 is a waveform diagram showing primary and secondary inductor currents and a feedback voltage over multiple switching cycles as the flyback converter of FIG. 3 charges a device and transitions from constant current mode to constant voltage mode.

FIG. 7 is a waveform diagram showing primary inductor current $(I_{LP})$ 38, the current $(I_S)$ through secondary inductor 35 and feedback signal $(V_{FB})$ 44 over multiple switching periods (cycles number 3-11) as flyback converter 30 charges a device. The waveforms illustrate how flyback converter 30 adjusts both the on time and the cycle time (also the switching frequency $f_S$) in step 96 of the method of FIG. 6 so as to maintain a constant output current $I_{OUT}$. The on time is adjusted such that the integrated-current voltage $V_{IC}$ equals the charge limit voltage $V_{CLIM}$. (For purposes of illustration, primary inductor current $I_{LP}$ 38 is compared to the charge limit voltage $V_{CLIM}$ and to the error voltage $V_{ERROR}$.)

As flyback converter 30 charges a device and the output voltage $V_{OUT}$ increases in the constant current mode, the cycle time is decreased so that the output current $I_{OUT}$ remains constant. FIG. 7 illustrates that the switching cycle A is longer at a lower voltage $V_{FB}$ of feedback signal 44 than the switching period B at a higher feedback voltage $V_{FB}$. The shorter switching period B corresponds to a higher switching frequency $f_S$.

The waveforms of FIG. 7 also illustrate how flyback converter 30 adjusts the on time in step 98 of the method of FIG. 6 so as to maintain a constant output voltage $V_{OUT}$. In the constant voltage mode, controller IC 31 adjusts the on time such that the peak of each pulse of primary inductor current $I_{LP}$ 38 maintains a constant output voltage $V_{OUT}$. As the device being charged progresses from cycle 8 to cycle 11 and approaches a fully charged condition, the output voltage $V_{OUT}$ approaches the predetermined maximum output voltage. FIG. 7 illustrates that the pulse width D is shorter than the pulse width C in order to decrease the peak current through primary inductor 34 as the reference voltage is approached. Controller IC 31 adjusts the on time such that the sampled feedback voltage $V_{FB}$ equals the reference voltage $V_{REF}$.

Figure 8:
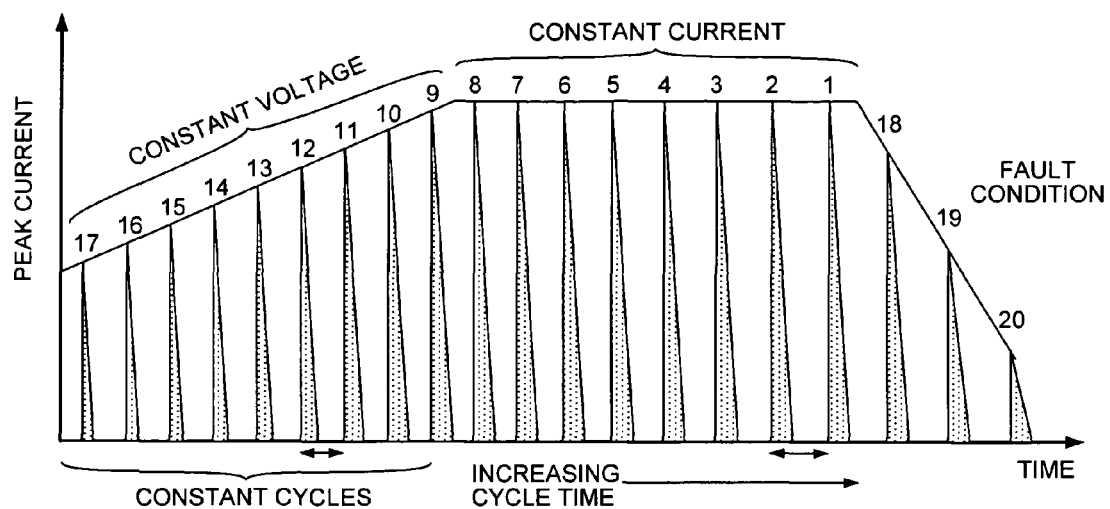
FIG. 8 is a graph of the peak current through the secondary inductor of the flyback converter of FIG. 3 over time in the constant current mode and in the constant voltage mode.

FIG. 8 is a graph of the peak current flowing through secondary inductor 35 over time in the constant current mode and constant voltage mode. Each peak approximates the current output by flyback converter 30 during one switching cycle. Switching cycle numbers 3-11 correspond to the same numbered switching cycles of FIG. 7. In the normal charging sequence of a battery, for example, the charging begins in the constant current mode at cycle #1 and enters the constant voltage mode at cycle #9. The load on flyback converter 30 is heaviest at the beginning when the battery begins charging. The load attempts to pull more current than the predetermined output current limit, and flyback converter 30 limits the output current in the constant current mode. As the battery charges and the load decreases, flyback converter 30 reduces the peak current after cycle #8 in order to maintain constant voltage.

When the charging stage is farther away from the constant voltage condition of cycle #9, the predetermined peak current limit $I_{PEAK}$ is farther from the level of primary inductor current $I_{LP}$ 38 that the load attempts to pull. Thus, the switching frequency $f_S$ must be reduced more to remain within the predetermined peak current limit $I_{PEAK}$. FIG. 8 illustrates that the cycle time increases from cycle #8 to cycle #1.

Figure 9:
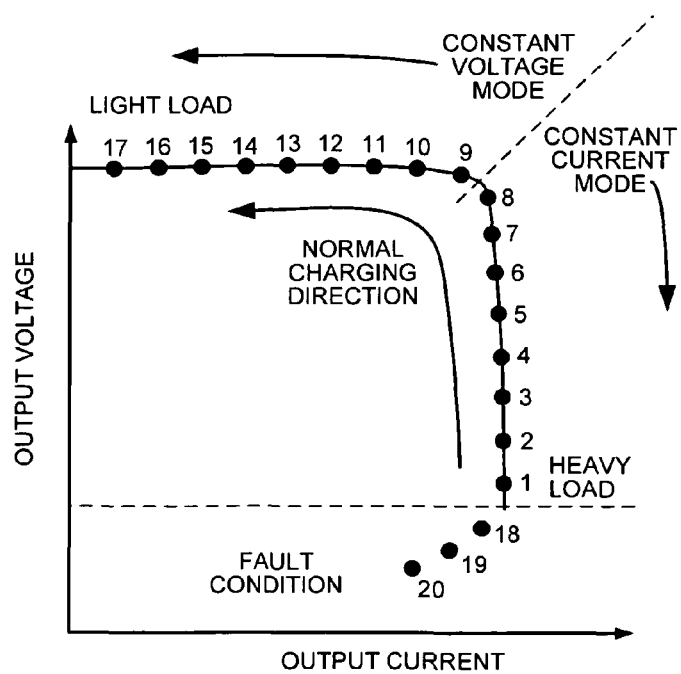
FIG. 9 is a graph of output voltage versus output current for the flyback converter of FIG. 3 showing the regions of operation in the constant current mode and the constant voltage mode.

FIG. 9 is a graph of output voltage versus output current for flyback converter 30. The numbers along the curve correspond to the peak currents in the cycles of FIG. 8. A normal charging process begins at point #1 and proceeds to point #17. A fault condition occurs where the output voltage falls below the fault threshold represented by the dashed line. When the output voltage falls below the fault threshold, the feedback voltage $V_{FB}$ present on feedback bond pad 65 drops below an under-voltage lockout turn-off threshold, and switching stops.

As flyback converter 30 enters the constant voltage mode, the voltage $V_{CS}$ of current sense signal 43 reaches the error voltage $V_{ERROR}$ before the integrated-current voltage $V_{IC}$ reaches the charge limit voltage $V_{CLIM}$. As the charging progresses during the constant voltage mode from point #9 to point #17, the cycle time remains constant, and the peak level of primary inductor current $I_{LP}$ 38 is reduced to maintain a constant output voltage. As charging progresses in the constant current mode from point #1 to point #8, the predetermined limit of primary inductor current $I_{LP}$ 38 remains constant, and the cycle time decreases (the switching frequency $f_S$ increases) as less frequency foldback is required to maintain the predetermined current limit.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a current sense voltage directly from a terminal of an integrated circuit, wherein the current sense voltage is indicative of an inductor current flowing through an inductor of a power converter, wherein the inductor exhibits an inductance, wherein the power converter has an input voltage, and wherein the power converter outputs an output current;
   generating a transconductance current from the current sense voltage received directly from the terminal;
   generating the output current with a magnitude that is independent of the inductance by integrating the transconductance current;
   generating an integrated-current voltage by integrating the transconductance current;
   generating a charge limit voltage that is inversely proportional to the input voltage;
   comparing the integrated-current voltage to the charge limit voltage; and
   stopping the inductor current from flowing through the inductor when the integrated-current voltage reaches the charge limit voltage.

2. A method comprising:
   receiving a current sense voltage directly from a terminal of an integrated circuit, wherein the current sense voltage is indicative of an inductor current flowing through a primary inductor of a power converter, wherein the power converter outputs an input voltage and an output current;
   generating a transconductance current using the current sense voltage;
   generating an integrated-current voltage by integrating the transconductance current;
   comparing the integrated-current voltage to a charge limit voltage that is inversely proportional to the input voltage; and
   stopping the inductor current from flowing through the primary inductor when the integrated-current voltage reaches the charge limit voltage, wherein the output current of the power converter is controlled by stopping the inductor current from flowing through the primary inductor.

3. The method of claim 2, further comprising:
   generating a clock signal; and
   starting the inductor current flowing through the primary inductor using the clock signal.

4. The method of claim 2, wherein the inductor current flows through the primary inductor during an on time of an inductor switch, and wherein the primary inductor exhibits an inductance, further comprising:
   generating a switching signal using the integrated-current voltage; and
   adjusting the on time of the inductor switch using the switching signal such that the output current remains constant at the predetermined current limit despite a variation in the inductance of the primary inductor.

5. The method of claim 2, wherein the inductor current flows through the primary inductor during an on time of an inductor switch, wherein the integrated-current voltage is generated by integrating the transconductance current during the on time, and wherein the integrated-current voltage is compared to the charge limit voltage during the on time.

6. The method of claim 2, wherein the inductor current flows through the primary inductor during an on time of an inductor switch, and wherein the inductor current does not flow through the primary inductor during an off time of the inductor switch, further comprising:
   generating an error voltage using a feedback voltage that is derived from a voltage across an auxiliary inductor of the power converter during the off time; and
   comparing the current sense voltage to the error voltage.

7. The method of claim 2, wherein the power converter is a flyback converter.

8. The method of claim 2, wherein the power converter has an auxiliary inductor and outputs an output voltage, wherein the power converter has a controller integrated circuit in an IC package, and wherein the IC package has a feedback pin, a current sense pin, and a base pin, further comprising:
   receiving onto the feedback pin a feedback voltage that is derived from a voltage across the auxiliary inductor;
   determining the output voltage using the feedback voltage;
   receiving the current sense voltage onto the current sense pin;

determining the output current using the current sense voltage; and generating a switching signal on the base pin using the current sense voltage, wherein the inductor current starts flowing through the primary inductor when the switching signal is asserted, and wherein the inductor current stops flowing through the primary inductor when the switching signal is deasserted.

9. A power converter comprising:

an inductor, wherein an inductor current flowing through the inductor ramps up during an on time, wherein the inductor current does not flow through the inductor during an off time, and wherein the power converter has an input voltage;

a controller integrated circuit with a current sense terminal;

a current integrator that receives a current sense voltage directly from the current sense terminal and generates an integrated-current voltage by integrating the current sense voltage during the on time; and a comparator that generates a current control signal by comparing the integrated-current voltage to a charge limit voltage that is inversely proportional to the input voltage, wherein the on time ends and the off time begins when the current control signal is asserted.

10. The power converter of claim 9, wherein the current integrator generates a transconductance current using the current sense voltage, and wherein the current integrator generates the integrated-current voltage by integrating the transconductance current.

11. The power converter of claim 9, further comprising:

an oscillator that generates a clock signal, wherein the clock signal starts the on time.

12. The power converter of claim 11, wherein the on time plus the off time equals a cycle time, and wherein the power converter maintains a constant output current by using the current control signal to adjust the on time and the clock signal to adjust the cycle time.

13. The power converter of claim 9, wherein the power converter operates in a constant current mode, further comprising:

an inductor switch that is controlled by a switching signal, wherein in the constant current mode the switching signal turns off the inductor switch when the current control signal is asserted.

14. The power converter of claim 9, wherein the power converter operates in discontinuous conduction mode.

15. The power converter of claim 9, wherein the inductor exhibits an inductance, wherein the power converter outputs an output current, and wherein the current control signal adjusts the on time such that the output current does not exceed a predetermined current limit despite a variation in the inductance.

16. The power converter of claim 9, further comprising:

a resistor network; and an auxiliary inductor, wherein an IC package that contains the controller integrated circuit has a feedback pin, and wherein the auxiliary inductor is coupled through the resistor network to the feedback pin.

17. A power converter, comprising:

an inductor that exhibits an inductance, wherein an inductor current ramps UP through the inductor during an on time, and wherein the power converter outputs an output current;

a controller integrated circuit with a current sense terminal;

means for receiving a current sense voltage directly from the current sense terminal and for integrating the current sense voltage to adjust the on time such that the output current does not exceed a predetermined current limit despite a variation in the inductance, wherein the means generates an integrated-current voltage by integrating the current sense voltage, and wherein the power converter receives an input voltage; and a comparator that compares the integrated-current voltage to a charge limit voltage that is inversely proportional to the input voltage, wherein the inductor current stops ramping up through the inductor when the integrated-current voltage reaches the charge limit voltage.

18. A method comprising:

receiving a current sense voltage directly from a terminal of an integrated circuit, wherein the current sense voltage is indicative of an inductor current flowing through a primary inductor of a power converter, wherein the power converter has an input voltage, wherein the primary inductor exhibits an inductance, and wherein the terminal is connected to a current sense resistor;

generating a charge limit voltage that is inversely proportional to the input voltage;

generating a transconductance current from the current sense voltage; and generating an integrated-current voltage by integrating the transconductance current while the inductor current flows through the primary inductor and until the integrated-current voltage reaches the charge limit voltage.

19. The method of claim 18, further comprising:

generating an output current of the power converter having a magnitude that is independent of the inductance.

* * * * *